US008860787B1

(12) United States Patent
Neven

(10) Patent No.: US 8,860,787 B1
(45) Date of Patent: Oct. 14, 2014

(54) METHOD AND APPARATUS FOR TELEPRESENCE SHARING

(75) Inventor: Hartmut Neven, Malibu, CA (US)

(73) Assignee: Google Inc., Mountain View, CA (US)

( * ) Notice: Subject to any disclaimer, the term of this patent is extended or adjusted under 35 U.S.C. 154(b) by 359 days.

(21) Appl. No.: 13/105,623

(22) Filed: May 11, 2011

(51) Int. Cl.
 *H04N 13/02* (2006.01)
 *H04N 13/04* (2006.01)
 *G05G 5/00* (2006.01)

(52) U.S. Cl.
 USPC .. 348/46; 348/51; 348/E13.074; 348/E13.075

(58) Field of Classification Search
 USPC ................ 701/2, 28, 213; 348/14.12, 46, 51, 348/E13.074, E13.075; 700/259
 See application file for complete search history.

(56) References Cited

U.S. PATENT DOCUMENTS

| | | | |
|---|---|---|---|
| 3,916,094 A | 10/1975 | Marrone | |
| 4,405,943 A | 9/1983 | Kanaly | |
| 4,711,512 A | 12/1987 | Upatnieks | |
| 4,852,988 A | 8/1989 | Velez et al. | |
| 4,972,504 A | 11/1990 | Daniel et al. | |
| 5,076,664 A | 12/1991 | Migozzi | |
| 5,315,093 A | 5/1994 | Stewart | |
| 5,331,544 A | 7/1994 | Lu et al. | |
| 5,802,296 A | 9/1998 | Morse et al. | |
| 6,011,578 A | 1/2000 | Shatto et al. | |
| 6,307,526 B1 | 10/2001 | Mann | |
| 6,393,136 B1 | 5/2002 | Amir et al. | |
| 6,526,156 B1 | 2/2003 | Black et al. | |
| 6,539,100 B1 | 3/2003 | Amir et al. | |
| 6,577,329 B1 | 6/2003 | Flickner et al. | |
| 6,608,615 B1 | 8/2003 | Martins | |
| 6,661,907 B2 | 12/2003 | Ho et al. | |
| 6,690,516 B2 | 2/2004 | Aritake et al. | |
| 6,707,933 B1 | 3/2004 | Mariani et al. | |
| 6,711,414 B1 | 3/2004 | Lightman et al. | |
| 6,741,756 B1 | 5/2004 | Toyama et al. | |
| 6,763,148 B1 | 7/2004 | Sternberg et al. | |
| 6,772,129 B2 | 8/2004 | Alvarez et al. | |
| 6,957,393 B2 | 10/2005 | Fano et al. | |
| 6,961,755 B2 | 11/2005 | Matsuda | |
| 6,973,201 B1 | 12/2005 | Colmenarez et al. | |

(Continued)

FOREIGN PATENT DOCUMENTS

| EP | 2113431 A1 | 11/2009 |
|---|---|---|
| WO | WO 99/05880 | 2/1999 |

OTHER PUBLICATIONS

Machlis, Matthew Alan, "Investigation of Visual Interface Issues in Teleoperation Using a Virtual Teleoperator," S.B. Aeronautics and Astronautics, Massachusetts Institute of Technology, 1989, 169 pages.

(Continued)

*Primary Examiner* — Joseph J Nguyen
(74) *Attorney, Agent, or Firm* — Blakely, Sokoloff, Taylor & Zafman LLP

(57) ABSTRACT

A method and apparatus for telepresence sharing is described. The method may include providing an indication of a plurality of remote vehicles that are available for telepresence sharing to a user. The method may also include receiving a selection from the user to engage a remote vehicle from the plurality of remote vehicles in a telepresence sharing session. Furthermore, the method may also include providing a live video feed captured by the remote vehicle to a mobile device associated with the user.

17 Claims, 10 Drawing Sheets

(56) References Cited

U.S. PATENT DOCUMENTS

| | | | |
|---|---|---|---|
| 7,035,456 B2 | 4/2006 | Lestideau | |
| 7,043,056 B2 | 5/2006 | Edwards et al. | |
| 7,046,826 B2 | 5/2006 | Toyama | |
| 7,062,797 B2* | 6/2006 | Khulusi | 2/431 |
| 7,092,971 B2 | 8/2006 | Idei et al. | |
| 7,103,379 B2 | 9/2006 | Hilerio | |
| 7,120,880 B1 | 10/2006 | Dryer et al. | |
| 7,262,573 B2 | 8/2007 | Wang et al. | |
| 7,340,214 B1 | 3/2008 | Hamberg | |
| 7,477,780 B2 | 1/2009 | Boncyk et al. | |
| 7,558,922 B2 | 7/2009 | Murase | |
| 7,565,139 B2 | 7/2009 | Neven et al. | |
| 7,643,658 B2 | 1/2010 | Kilner et al. | |
| 7,657,062 B2 | 2/2010 | Pilu | |
| 7,736,000 B2 | 6/2010 | Enriquez et al. | |
| 7,769,632 B2 | 8/2010 | Giraud et al. | |
| 7,885,635 B2 | 2/2011 | Laursen et al. | |
| 7,936,484 B2 | 5/2011 | Roncall | |
| 8,005,507 B2 | 8/2011 | Celik | |
| 8,098,894 B2 | 1/2012 | Soderstrom | |
| 8,107,921 B2 | 1/2012 | Fiatal | |
| 8,130,242 B2 | 3/2012 | Cohen | |
| 8,190,733 B1 | 5/2012 | Hoffman et al. | |
| 8,208,681 B2 | 6/2012 | Heller et al. | |
| 8,255,092 B2* | 8/2012 | Phillips et al. | 701/2 |
| 8,332,424 B2 | 12/2012 | Flynn et al. | |
| 8,428,618 B2 | 4/2013 | Fano et al. | |
| 2001/0003189 A1 | 6/2001 | Miyazawa et al. | |
| 2002/0010623 A1 | 1/2002 | McCollom et al. | |
| 2002/0102024 A1 | 8/2002 | Jones et al. | |
| 2002/0116265 A1 | 8/2002 | Hernandez | |
| 2002/0159627 A1 | 10/2002 | Schneiderman et al. | |
| 2003/0098954 A1 | 5/2003 | Amir et al. | |
| 2003/0107649 A1 | 6/2003 | Flickner et al. | |
| 2003/0161500 A1 | 8/2003 | Blake et al. | |
| 2004/0058694 A1 | 3/2004 | Mendiola et al. | |
| 2004/0098320 A1 | 5/2004 | Mitsuhashi et al. | |
| 2004/0100567 A1 | 5/2004 | Miller et al. | |
| 2004/0240708 A1 | 12/2004 | Hu et al. | |
| 2005/0027794 A1* | 2/2005 | Decker | 709/201 |
| 2005/0125150 A1* | 6/2005 | Wang et al. | 701/213 |
| 2005/0180626 A1 | 8/2005 | Moon et al. | |
| 2005/0200476 A1 | 9/2005 | Forr et al. | |
| 2005/0203798 A1 | 9/2005 | Jensen et al. | |
| 2005/0265581 A1 | 12/2005 | Porter et al. | |
| 2005/0267826 A1* | 12/2005 | Levy et al. | 705/34 |
| 2006/0041480 A1 | 2/2006 | Briggs | |
| 2006/0212658 A1 | 9/2006 | Hrle et al. | |
| 2006/0253491 A1 | 11/2006 | Gokturk et al. | |
| 2007/0047816 A1 | 3/2007 | Graham et al. | |
| 2007/0149286 A1 | 6/2007 | Bemmel | |
| 2007/0150450 A1 | 6/2007 | Murase | |
| 2008/0027591 A1* | 1/2008 | Lenser et al. | 701/2 |
| 2008/0063389 A1* | 3/2008 | Fang et al. | 396/56 |
| 2008/0147488 A1 | 6/2008 | Tunick et al. | |
| 2009/0143913 A1* | 6/2009 | Kim et al. | 700/259 |
| 2009/0189974 A1* | 7/2009 | Deering | 348/46 |
| 2009/0248223 A1* | 10/2009 | Ecton et al. | 701/2 |
| 2009/0287990 A1 | 11/2009 | Lynton et al. | |
| 2010/0046842 A1 | 2/2010 | Conwell | |
| 2010/0048242 A1 | 2/2010 | Rhoads et al. | |
| 2010/0066587 A1* | 3/2010 | Yamauchi et al. | 342/70 |
| 2010/0103075 A1 | 4/2010 | Kalaboukis et al. | |
| 2010/0227594 A1 | 9/2010 | DeVries | |
| 2010/0260426 A1 | 10/2010 | Huang et al. | |
| 2010/0278439 A1 | 11/2010 | Lennington et al. | |
| 2010/0287175 A1 | 11/2010 | Beaudreau et al. | |
| 2010/0318538 A1 | 12/2010 | Wyman et al. | |
| 2011/0032324 A1* | 2/2011 | George et al. | 348/14.12 |
| 2011/0034176 A1 | 2/2011 | Lord et al. | |
| 2011/0054717 A1* | 3/2011 | Yamauchi et al. | 701/2 |
| 2011/0085041 A1 | 4/2011 | Kildevaeld | |
| 2011/0184556 A1 | 7/2011 | Seth et al. | |
| 2011/0208593 A1 | 8/2011 | Nishida et al. | |
| 2011/0213664 A1* | 9/2011 | Osterhout et al. | 705/14.58 |
| 2011/0246246 A1* | 10/2011 | Johnson | 705/5 |
| 2012/0094763 A1 | 4/2012 | Khan | |
| 2012/0106857 A1 | 5/2012 | Schneiderman et al. | |
| 2012/0173020 A1 | 7/2012 | Seth et al. | |
| 2012/0229270 A1 | 9/2012 | Morley et al. | |
| 2012/0239196 A1* | 9/2012 | Olivier et al. | 700/259 |
| 2012/0300974 A1 | 11/2012 | Rodriguez | |
| 2012/0308209 A1 | 12/2012 | Zaletel | |
| 2012/0323685 A1 | 12/2012 | Ullah | |
| 2013/0009994 A1 | 1/2013 | Hill | |
| 2013/0036134 A1 | 2/2013 | Neven et al. | |

OTHER PUBLICATIONS

Righetti, Xavier, et al "Immersive flight for surveillance applications," IEEE Symposium on 3D Interfaces, Mar. 10-11, 2007, 4 pages.

U.S. Appl. No. 13/107,295, filed May 13, 2011, Flynn et al.

U.S. Appl. No. 13/344,299, filed Jan. 5, 2012, Anguelov et al.

Applied Science Laboratories, "H6HS Head Mounted Eye Tracking System," Innovations in Eye Tracking, 2009, 2 pages.

Babcock, J.S., et al, "Building a Lightweight Eyetracking Headgear," Proc of the 2004 Symposium on Eye Tracking Research & Applications, 2004, pp. 109-113.

Herrick, Dan R, "Google This! Using Google Apps for Collaboration and Productivity," ACM SIGUCCS;09, Oct. 11-14, 2009, pp. 55-63.

Li, D, et al, "OpenEyes: A Low-Cost Head-Mounted Eye-Tracking Solution," Proc of the 2004 Symposium on Eye Tracking Research & Applications, 2006, 7 pages.

Nagao, Katashi, et al, "Ubiquitous Talker: Spoken Language Interaction with Real World Objects," Technical Report SCSL-TR-95-003, Sony Computer Science Laboratory Inc., Tokyo, Japan, 1995, 11 pages.

Namboodiri, Vinod, "Towards Sustainability in Portable Computing through Cloud Computing and Cognitive Radios," IEEE 2010, 2010 39th International Conference on Parallel Processing Workshops, pp. 468-475.

PCT/US2012/035275, International Search Report and Written Opinion, Mailed Aug. 13, 2012, 12 pages.

PCT/US2012/35284, International Search Report and Written Opinion, Mailed Jul. 24, 2010, 9 pages.

U.S. Appl. No. 13/107,295, Notice of Allowance, Mailed Aug. 16, 2012, 22 pages.

Wikipedia, "Lifelog," <http://en.wikipedia.org/wiki/lifelog>, Last Modified Apr. 3, 2011, 3 pages.

* cited by examiner

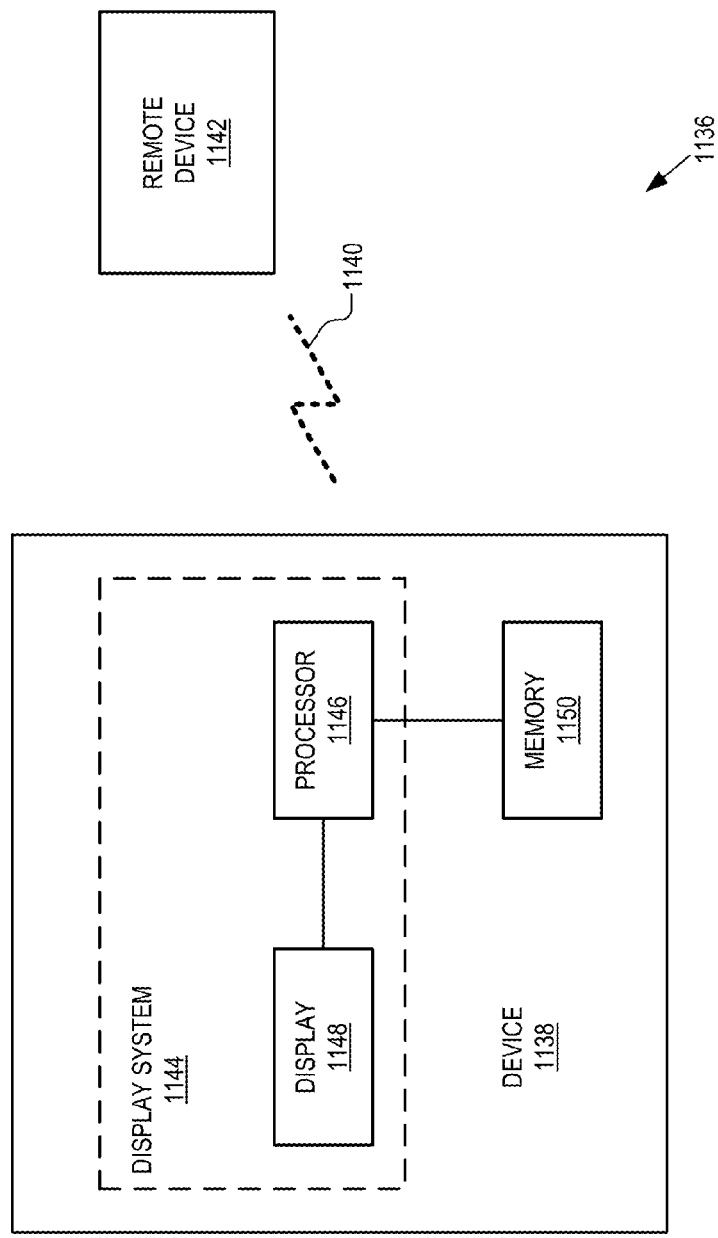

US 8,860,787 B1

METHOD AND APPARATUS FOR TELEPRESENCE SHARING

TECHNICAL FIELD

Embodiments of the invention relate to the field of telepresence sharing, and more particularly, to sharing digital video from a remote source.

BACKGROUND

The internet provides a vast amount of knowledge about people, places, and things. Users utilize search engines to cull through the vast array of available knowledge when they want detailed information about a particular person, place, or thing. Mobile devices may be utilized to access the internet and conduct searches from anywhere. For example, when a user is standing next to a historical landmark, he or she may search historical data for the landmark, photos relevant to the landmark, etc. A search engine returns results to the user based on the query by locating relevant content that was found by the search engine via a web crawl.

The information available on the internet, however, does not provide users with a first-hand experience with objects that they are interested in. For example, a user may search the Great Wall of China and receive thousands of pages that describe the Great Wall, present pictures taken of the Great Wall, etc. Even with all this information, the user still lacks the experience of viewing and exploring the Great Wall.

SUMMARY

A method and apparatus for telepresence sharing is described. According to an exemplary method, an indication of a plurality of remote vehicles that are available for telepresence sharing is provided to a user. In one embodiment, a selection is received from the user to engage a remote vehicle from the plurality of remote vehicles in a telepresence sharing session. In one embodiment, the exemplary method may also include providing a live video feed captured by the remote vehicle to a mobile device associated with the user.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 11 illustrates an example schematic drawing of a computer network infrastructure.

DETAILED DESCRIPTION

Figure 1:
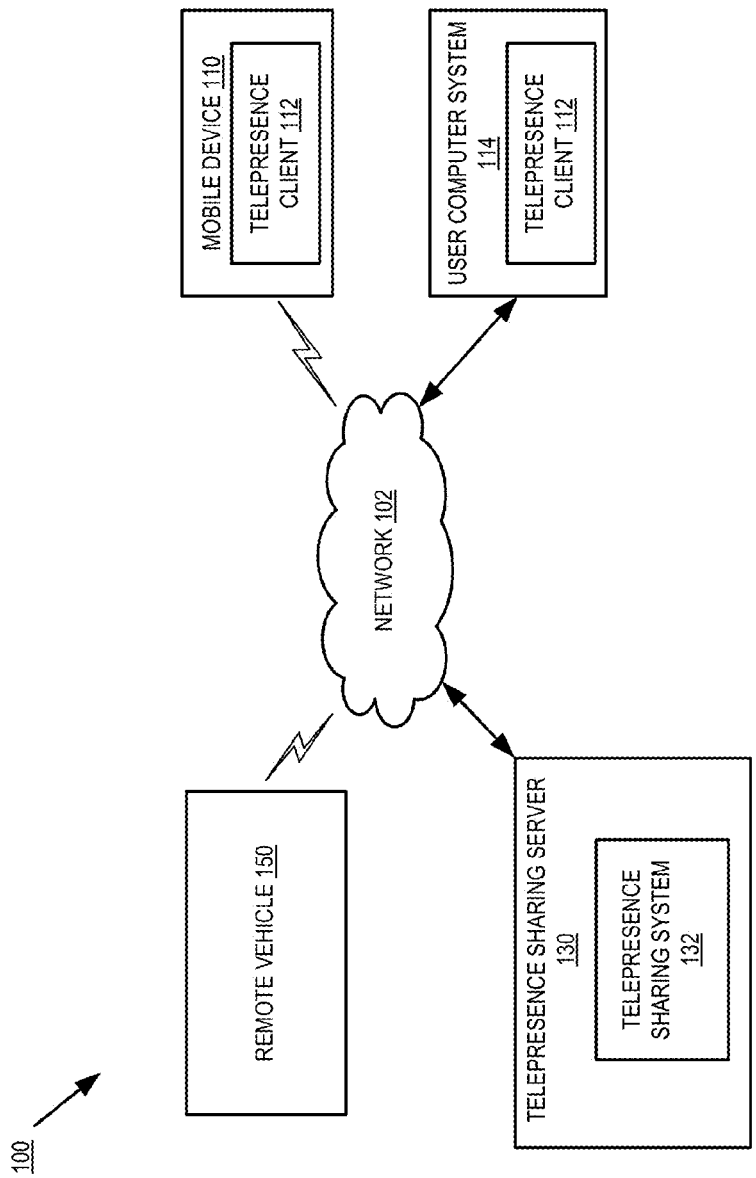
FIG. 1 is a block diagram of exemplary system architecture for enabling telepresence sharing.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "providing", "generating", "storing", "selecting", "inserting", "transmitting", "querying", "obtaining", "filtering", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of exemplary system architecture 100 for enabling telepresence sharing. In one embodiment, the system 100 includes a mobile device 110, a user computer system 114, a telepresence sharing server 130, and a remote vehicle 150. In one embodiment, mobile device 110 may be a mobile computing device, such as a mobile telephone, personal digital assistant, tablet computer, wearable computing device, etc. The telepresence sharing server 130 and user computer system 114 may also be computing devices, such as a server computers, desktop computers, etc. The remote vehicle 150 may be a vehicle that is capable of receiving electronic commands, responding to those commands, and transmitting video data captured by the remote vehicle 114.

The mobile device 110, user computer system 114, telepresence sharing server 130, and remote vehicle 150 may be coupled to a network 102 that communicates any of the standard protocols for the exchange of information. In one embodiment, mobile device 110 and remote vehicle 150 are coupled with network 102 via a wireless connection, such as a cellular telephone connection, wireless fidelity connection, etc. The mobile device 110, user computer system 114, telepresence sharing server 130, and remote vehicle 150 may run on one Local Area Network (LAN) and may be incorporated into the same physical or logical system, or different physical or logical systems. Alternatively, the mobile device 110, user computer system 114, telepresence sharing server 130, and remote vehicle 150 may reside on different LANs, wide area networks, cellular telephone networks, etc. that may be coupled together via the Internet but separated by firewalls, routers, and/or other network devices. In yet another configuration, the telepresence sharing server 130 may reside on the same server, or different servers, coupled to other devices via a public network (e.g., the Internet) or a private network (e.g., LAN). It should be noted that various other network configurations can be used including, for example, hosted configurations, distributed configurations, centralized configurations, etc.

The mobile device 110 is responsible for initiating a telepresence sharing session with telepresence sharing server 130. As will be discussed in greater detail below, telepresence sharing enables mobile device 110 to share in the experiences of a remote vehicle, such as remote vehicle 150, through the telepresence sharing server 130. For example, remote vehicle 150 may share live video data with mobile device 110. Furthermore, in one embodiment, mobile device 110 may generate control signals to control the operation of the remote vehicle 150, and receive updated video captured by the remote vehicle 150. In one embodiment, user computer system 114 may also initiate a telepresence sharing session. In one embodiment, the telepresence sharing session initiated by user computer system 114 may be a telepresence sharing session for mobile device 110.

Figure 9:
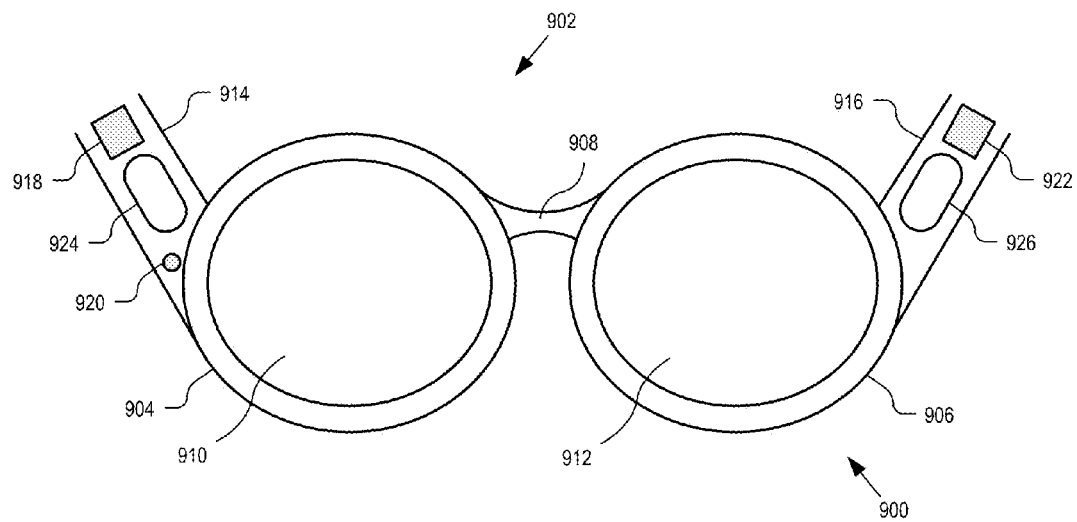
FIG. 9 illustrates an example system for telepresence sharing with a wearable computing system.
Figure 10:
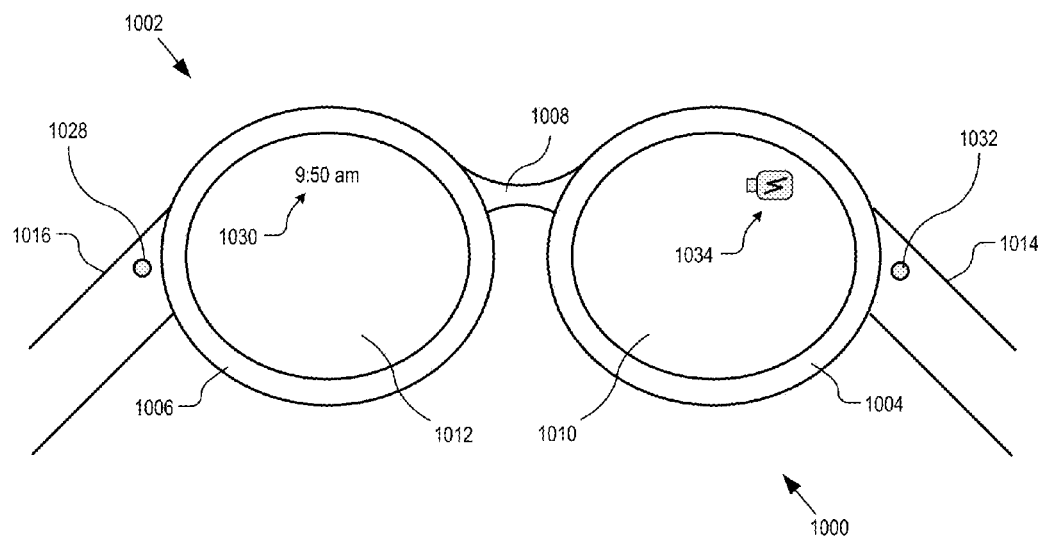
FIG. 10 illustrates an alternate view of an example system for telepresence sharing with a wearable computing system.

For example, in one embodiment, mobile vehicle 150 may be a remote controlled helicopter, and mobile device 110 may be the user wearable computing system illustrated in FIG. 9 or 10. The remote controlled helicopter may capture video as it flies around a real world location, such as a historical landmark, a tourist location, a location where a news event is occurring, etc. This video would then be transmitted in real time to the user wearable computing system via the telepresence sharing server 130. In one embodiment, the user wearable computing system would further be able to control the flight of the remote controlled helicopter by generating control signals, and transmitting those control signals to the remote controlled helicopter via the telepresence sharing server 130. In one embodiment, the control signals could be generated from movement of the user wearable computing system. In one embodiment, sensors, such as accelerometers, of the user wearable computing system could detect that the user wearable computing system has tilted to the right. A corresponding control signal would be generated by the user wearable computing system and transmitted to the remote controlled helicopter. The remote controlled helicopter would respond to this control signal by banking right, and continuing to transmit the real time video. As a result, a user of the user wearable computing system is able to control the operation of the remote controlled helicopter and view the received video feed captured by the remote controlled helicopter. The responsiveness to user controls combined with the real-time video feed enables the user of the user wearable computing system to feel as if they were present in the remote controlled helicopter.

In one embodiment, the telepresence client 112 of mobile device 110 or user computer system 114 requests a listing of remote vehicles, such as remote vehicle 150, from the telepresence sharing system 132 of telepresence sharing server 130 that are available for telepresence sharing. In one embodiment, the telepresence client 112 receives an indication of one or more remote vehicles that may be purchased, rented, or otherwise engaged for telepresence sharing. In one embodiment, the listing may include terms of the telepresence sharing session (e.g., price, duration of session, skill level required, etc.).

In one embodiment, telepresence client 112 receives a user selection of an available remote vehicle 150, and transmits the selection along with the corresponding usage terms for the selected telepresence session to telepresence sharing system 132. In one embodiment, telepresence client 112 of user computer system 114 may make a selection for engaging the mobile device 110 in a telepresence sharing session. For example, a user may select to engage remote vehicle 150 in a telepresence sharing session from his home computer 114. However, the actual telepresence sharing session is provided to the user via the mobile device 110.

Telepresence sharing system 132 of telepresence server 130 receives the selection of remote vehicle 150 and the associated usage terms for the selected telepresence session. In one embodiment, telepresence sharing system 132 transmits a notification to remote vehicle 150 that causes remote vehicle 150 to connect to telepresence sharing system 132. In one embodiment, the connection includes a live video feed, captured by remote vehicle 150 and transmitted to telepresence sharing system 132. In one embodiment, the connection may also include remote vehicle 150 establishing a channel for accepting operation control signals. For example, where remote vehicle 150 is a remote controlled helicopter, the channel could be opened to accept operation control signals such as turn right, turn left, ascend, descent, bank right, bank left, accelerate, and decelerate. As another example, where remote vehicle is a remote controlled car, tank, robot, etc., the channel could be opened to accept operation control signals such as turn right, turn left, accelerate, decelerate, forward, and reverse. As yet another example, in one embodiment, no channel is opened to accept control signals. Instead, only a live video feed is provided to the telepresence client 112 of mobile device 110. In this example, a live video feed captured by a pilot of a commercial airplane, captain of a cruise ship, etc., could be shared with a mobile device, or a group of user devices such as user computer system 114. In this example, a pilot, captain, etc. would not accept another person's control of their vehicle, but the live video from their vantage point would still be interesting to users of mobile device 110 and user computer system 114.

In one embodiment, telepresence sharing system 132 receives a live video feed from remote vehicle 150 and transmits the remote video to telepresence client 112 of mobile device 110. As discussed above, the video feed may be sent exclusively to mobile device 110, shared with another device such as user computer system 114, or shared with one or more other devices (not shown). In one embodiment, where telepresence client 112 generates operation control signals, telepresence sharing system 132 receives the operation control signals, and forwards them to remote vehicle 150. Thus, in the embodiment, telepresence sharing system 132 provides live video to telepresence client 112, and transmits operation control signals generated by telepresence client 112 in real time to remote vehicle 150. The live video feed and responsiveness to operation control signals immerses a user of mobile device 110 in the reality provided by remote vehicle 150. That is, a user may feel as if they are in the remote vehicle since the user is provided with a continuously updated view from the remote vehicle, and the vehicle immediately responds to user commands.

In one embodiment, telepresence sharing system 132 receives an indication that the telepresence sharing session has ended. In one embodiment, telepresence client 112 of mobile device 110 or user computer system 114 may terminate the telepresence sharing session. In another embodiment, remote vehicle 150 may terminate the telepresence sharing session. Remote vehicle 150 may terminate the telepresence sharing session by ceasing transmission of a video feed when, for example, the remote vehicle crashes, is destroyed, runs out of power, exceeds a distance away from a base station, etc. In yet another embodiment, telepresence sharing system 132 may terminate a telepresence sharing session when, for example, the terms of the telepresence sharing session have been satisfied (i.e., prepaid rental time has elapsed) or broken (i.e., user control exceeds a safety level).

Figure 2:
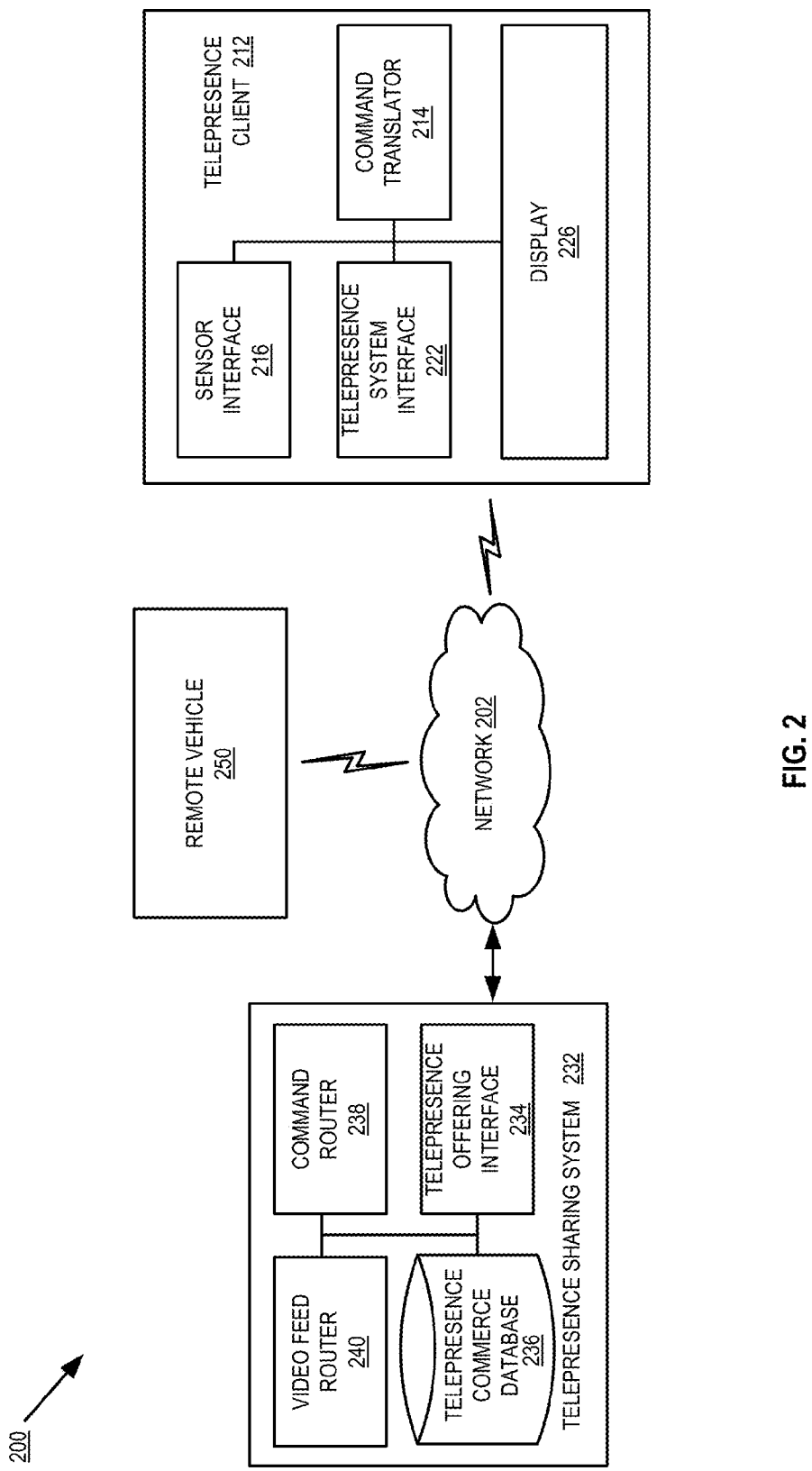
FIG. 2 is a block diagram of one embodiment of a telepresence sharing system and a telepresence client.

FIG. 2 is a block diagram of one embodiment 200 of a telepresence sharing system and a telepresence client. Telepresence client 212 and telepresence sharing system 232 provide additional details for the telepresence client 112 and telepresence sharing system 132 discussed above in FIG. 1.

In one embodiment, telepresence client 212 may include a telepresence system interface 222, a sensor interface 216, a command translator 214, and a display 226. In one embodiment, telepresence sharing system 232 may include a telepresence offering interface 234, telepresence commerce database 236, command router 238, and video feed router 240. In one embodiment, the telepresence client 212 and telepresence sharing system 232 communicate with each other over various networks 202 and network configurations as discussed above in FIG. 1.

In the telepresence client 212, telepresence system interface 222 receives user commands for soliciting a listing of remote vehicles, such as remote vehicle 250, available for telepresence sharing. In one embodiment, telepresence system interface 222 may generate a graphical user interface that is displayed on display 226. In one embodiment, telepresence system interface 222 communicates the user request for available remote vehicles to telepresence sharing system 232.

In one embodiment, telepresence offering interface 234 of telepresence sharing system 232 receives the user request. In one embodiment, in response to a user request for available remote vehicles, telepresence offering system 234 queries telepresence commerce database 236. In one embodiment, telepresence commerce database 236 stores vehicle data for the available remote vehicles, such as location of the remote vehicle, vehicle type, ability of the vehicle to accept operation commands, capabilities of the remote vehicle (e.g., top speed, maneuverability, maximum range from a charging base station, etc.), video type and quality provided by the remote vehicle, audio type and quality provided by the remote vehicle, etc. In one embodiment, telepresence commerce database 236 may also store financial data for telepresence sharing sessions associated with each remote vehicle, such as rental cost, purchase cost, rental insurance cost and availability, etc.

In one embodiment, telepresence offering system 234 transmits the vehicle data and associated financial data for the available remote vehicles to telepresence system interface 222. In one embodiment, telepresence system interface 222 displays the received vehicle data and financial data in a graphical user interface on display 226. In one embodiment, telepresence system interface 222 and telepresence offering system 234 may communicate multiple user requests and receive multiple responses in order to narrow a listing of available remote vehicles provided to telepresence client 212. For example, telepresence system interface 222 could transmit an initial request for the availability of remote vehicles in the United States. Based on where telepresence offering interface 234 indicates remote vehicles are available, telepresence system interface 222 could transmit an additional request to display a more detailed listing of remote vehicles available in California. There are numerous ways that the availability of remote vehicles provided to telepresence client 212 could be filtered or narrowed for a user.

Telepresence system interface 222 receives a user selection of remote vehicle 250, from the listing of available remote vehicles, as well as user selection and/or assent to terms of the telepresence sharing with remote vehicle 250. For example, the terms associated with the remote vehicle 250 telepresence sharing session may include an agreed upon hourly rental charge, an acknowledgment that the user must return remote vehicle 250 to a charging station (not shown) before a battery of the remote vehicle dies, purchase of rental insurance, etc. In one embodiment, telepresence offering system 234 stores the received user selections in telepresence commerce database 236. Furthermore, in response to receiving the user selection of terms and of remote vehicle 250, telepresence system interface 222 notifies remote vehicle 250.

In response to receiving the notification, remote vehicle 250 powers on and begins to capture video data with a camera of remote vehicle 250. In one embodiment, remote vehicle 250 transmits the video data to telepresence sharing system 232. In one embodiment, remote vehicle 250 further captures audio data from a microphone of remote vehicle. In one embodiment, the audio data may be transmitted to telepresence sharing system 232 and routed to telepresence client 212 in a manner similar to that discussed below with respect to video data.

Video feed router 240 of telepresence sharing system 232 receives the video data from remote vehicle. The video data may be a live video stream, blocks of video data, etc. In one embodiment, video feed router 240 forwards the video data to telepresence system interface 222.

In one embodiment, telepresence system interface 222 receives the video data, corresponding to live video being captured by remote vehicle 250, and displays the video on display 226. In one embodiment, the live video is displayed to a user to visually immerse the user in the experience being captured by remote vehicle. For example, the video feed may display a pilot's real time view from the cockpit of a flight that a user of a mobile device is currently on.

Figure 6:
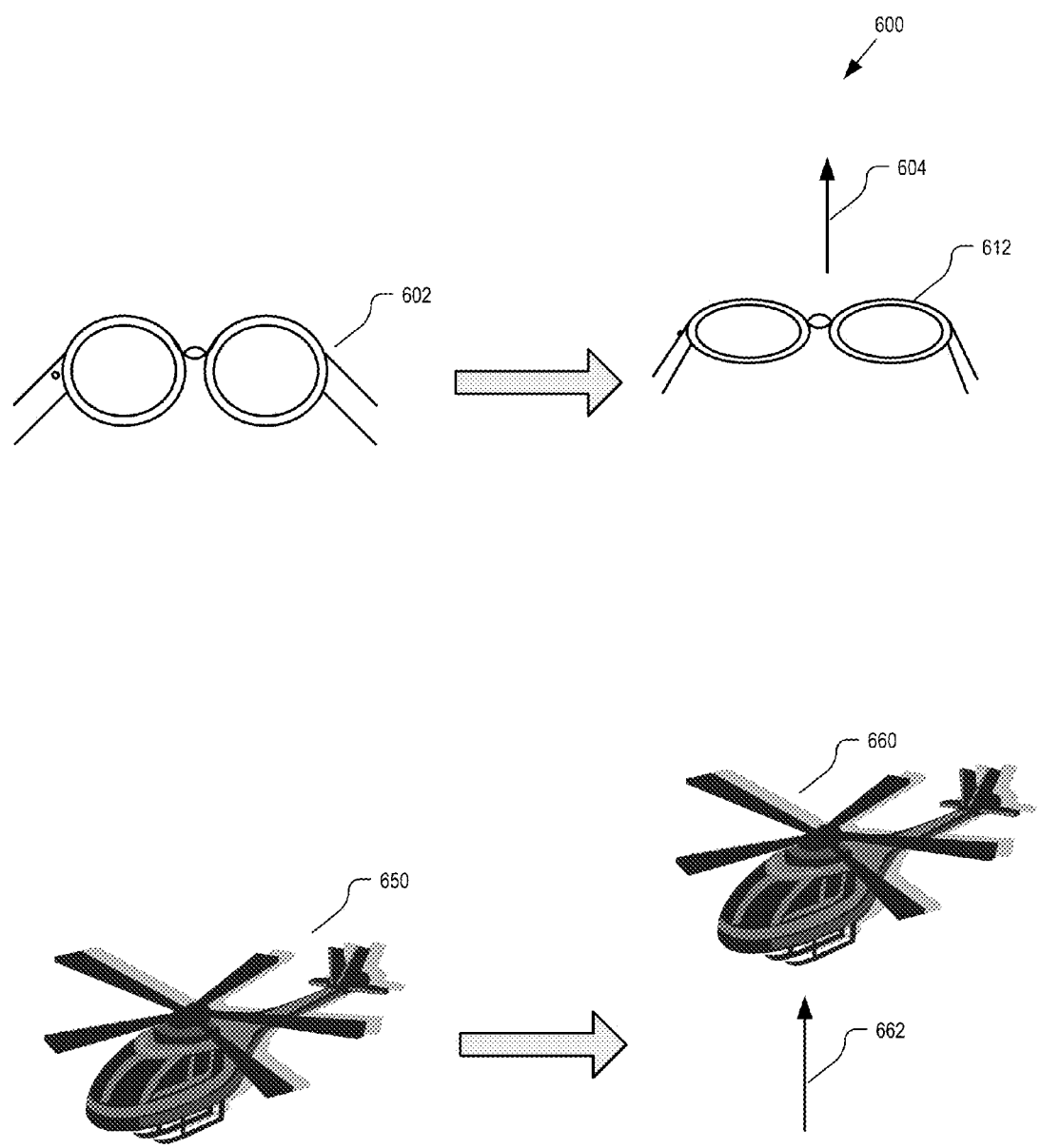
FIG. 6 illustrates an example control operation of a remote vehicle by a user wearable computing system.

In one embodiment, remote vehicle 250 not only provides a live video feed to telepresence client, but enables a user of telepresence client 212 to control the operation of remote vehicle 250. In one embodiment, telepresence client 212 includes a sensor interface 216. In one embodiment, sensor interface 216 receives sensor data from one or more sensors of a mobile device running telepresence client 212. For example, a mobile device may have several accelerometers that detect the orientation of the mobile device, accelerations of the mobile device, etc. In one embodiment, sensor interface 216 receives signals from the sensors indicating movement of the mobile device by a user. Sensor interface 216 provides the sensor data to command translator 214. In one embodiment, command translator 214 analyzes the sensor data to identify a user movement from sensor data and an associated remote vehicle operation control command. For example, and as illustrated in FIG. 6, when a user wearing a user wearable computing system 602 moves 604 his head by looking up 612, command translator 214 would receive sensor data from sensor interface 216 indicating a change in orientation and acceleration. Command translator 214 analyzes this data to determine that the user wearable computing system 612 has moved in a specific manner (e.g., a tilt, turn, raise, etc.), and selects a remote vehicle operation command that corresponds to the determined movement.

In one embodiment, based on the identified user movement, command translator 214 issues a remote vehicle operation command to telepresence system interface 222. In one embodiment, telepresence system interface transmits the command to command router 238 of telepresence sharing system 232. Command router 238 in turn routes the remote vehicle operation command to remote vehicle 250. In one embodiment, remote vehicle 250 responds to the command by performing the action specified in the command. Continuing the example above, the movement of the user wearable computer system 612 when a user looks up could indicate that a user has issued a command to remote vehicle 650 to ascend. As discussed above, the determined operation command is transmitted to the remote vehicle to cause the remote vehicle 660 to ascend 662 in response to the movement of the user wearable computing system 612.

As discussed above, remote vehicle 250 continues to provide real time video to telepresence client 212 from the vantage point of the remote vehicle 250. Furthermore, remote vehicle 250 continues to respond in real time to operation control commands generated by telepresence client 212. In one embodiment, a user of a mobile device, or user wearable computing system, that implements telepresence client 212 can immerse himself in the environment of the remote vehicle.

In the embodiments discussed herein, users may establish a remote telepresence by engaging and controlling remote vehicles. Such a telepresence could be used to, for example, view current events as they occur from a safe distance, to virtually tour a historical landmark or tourist spot without having to physically travel to that location, to remotely view a vacation house as a security measure, etc.

Figure 3:
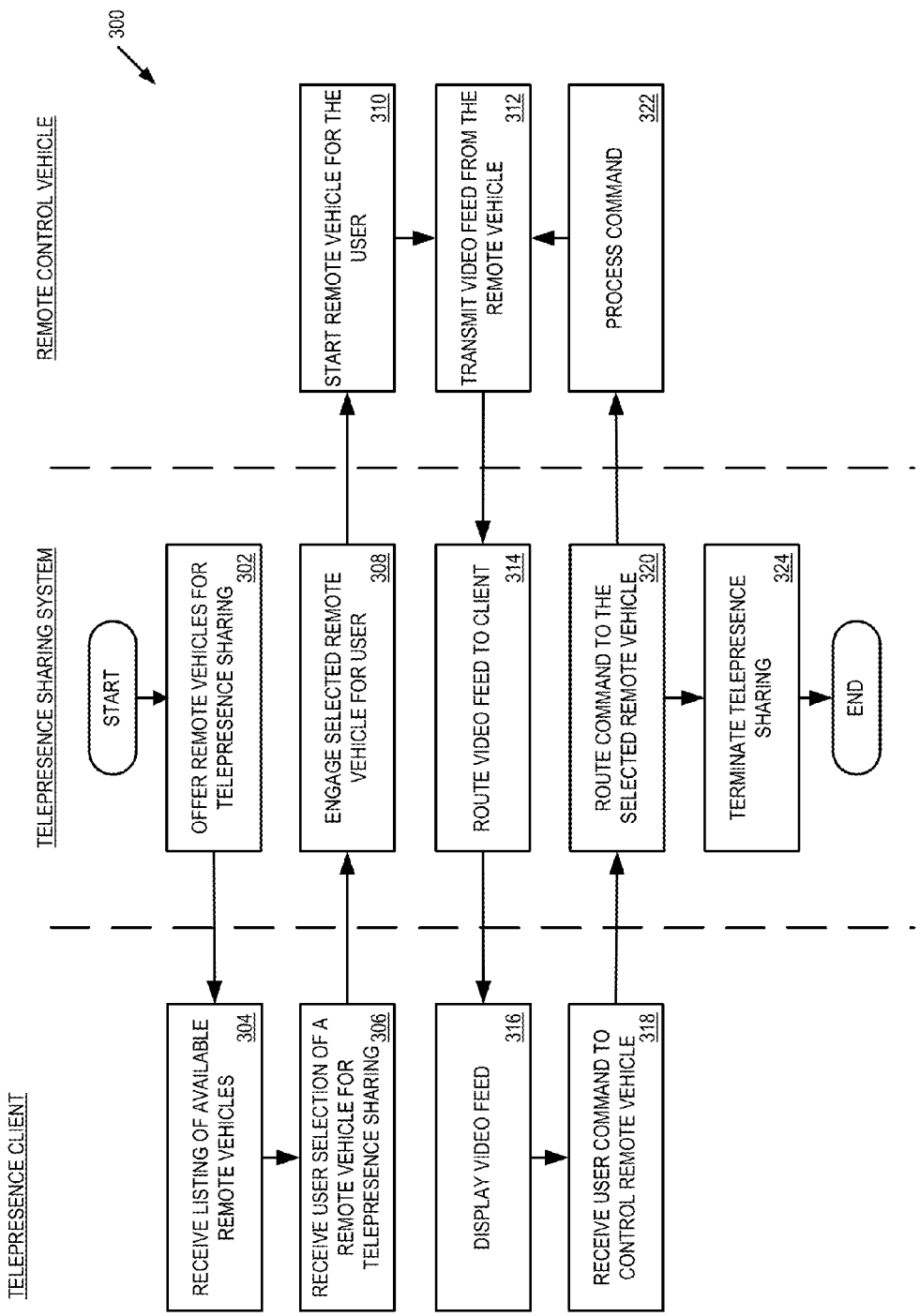
FIG. 3 is a flow diagram of one embodiment of a method for telepresence sharing for a remote vehicle operated by a telepresence client.

FIG. 3 is a flow diagram of one embodiment of a method 300 for telepresence sharing for a remote vehicle operated by a telepresence client. The method 300 is performed by processing logic that may comprise hardware (circuitry, dedicated logic, etc.), software (such as is run on a general purpose computer system or a dedicated machine), firmware, or a combination. In one embodiment, the method 300 is performed by a telepresence client, telepresence sharing system, and remote vehicle (e.g., telepresence client 112 or 212, telepresence sharing system 132 or 232, and remote vehicle 150 or 250).

Referring to FIG. 3, processing logic begins by offering remote vehicles by a telepresence sharing system for telepresence sharing (processing block 302). In one embodiment, the remote vehicles may include vehicles that capture and transmit video data in real time, and are capable of being remotely controlled. However, as discussed above, the remote vehicles may also only capture and transmit video data.

Processing logic receives the listing of available remote vehicles (processing block 304) and receives a user selection of one or the remote vehicles for telepresence sharing (processing block 306). In one embodiment, the user selection may include not only the specification of a remote vehicle for telepresence sharing, but also terms associated with the desired telepresence sharing session. In one embodiment, the terms may include financial terms, such as agreed rental price, damage fee, user credentials, payment information, etc.

Processing logic engages the selected remote control vehicle for the user (processing block 308). In response to receiving the engagement, processing logic of the remote control vehicle starts the vehicle for telepresence sharing (processing block 310). In one embodiment, processing logic starts the vehicle for telepresence sharing by initializing a video camera of the remote vehicle for capturing video data, and optionally starts a microphone to capture audio data. In one embodiment, processing logic also starts the vehicle for telepresence sharing by initializing a remote control reception unit of the remote device. As discussed above, in one embodiment, the remote vehicle may be remotely controlled by a telepresence client.

After the remote vehicle is started, processing logic transmits a video feed from the remote vehicle to a telepresence sharing system (processing block 312). In one embodiment, the video feed is real time video data captured by the remote vehicle. In one embodiment, this video feed may be streamed to the telepresence sharing system by the remote control vehicle. Processing logic routes the video feed from the telepresence sharing system to the telepresence client (processing block 314), and the video feed is displayed on a display of the telepresence client (processing block 316).

In one embodiment, processing logic further receives a user command to control the remote vehicle (processing block 318). The received user command is routed to the selected remote vehicle (processing block 320), where the remote vehicle processes the command (processing block 322). In one embodiment, as discussed above, a user command to control the remote vehicle may be received as data indicating user movement of a mobile device or movement of a user wearable computing system. For example, a user may tilt their mobile phone forward to indicate that a remote vehicle should accelerate. As another example, a user wearing a user wearable computing system may look up to indicate that a remote vehicle should ascend. These commands would be forwarded to a remote vehicle to cause the remote vehicle to implement the user commands, such as accelerating, ascending, etc.

In one embodiment, processing logic continues to transmit, route, and display video, as well as receive, route, and process user commands. In one embodiment, the video and commands are routed in real time to provide a user with a live experience in viewing and controlling a remote vehicle.

In one embodiment, the process ends when processing logic terminates the telepresence sharing session (processing block 324). In one embodiment, any of the telepresence client, telepresence sharing system, and remote vehicle can cause processing logic to terminate the telepresence sharing session. For example, a user could affirmatively cancel a telepresence sharing session by returning a remote vehicle to a rental location or charging station. As another example, when a user's purchased rental time has elapsed the remote control vehicle or telepresence sharing system could terminate the user's video feed, allow the user to purchase more time, etc.

Figure 4:
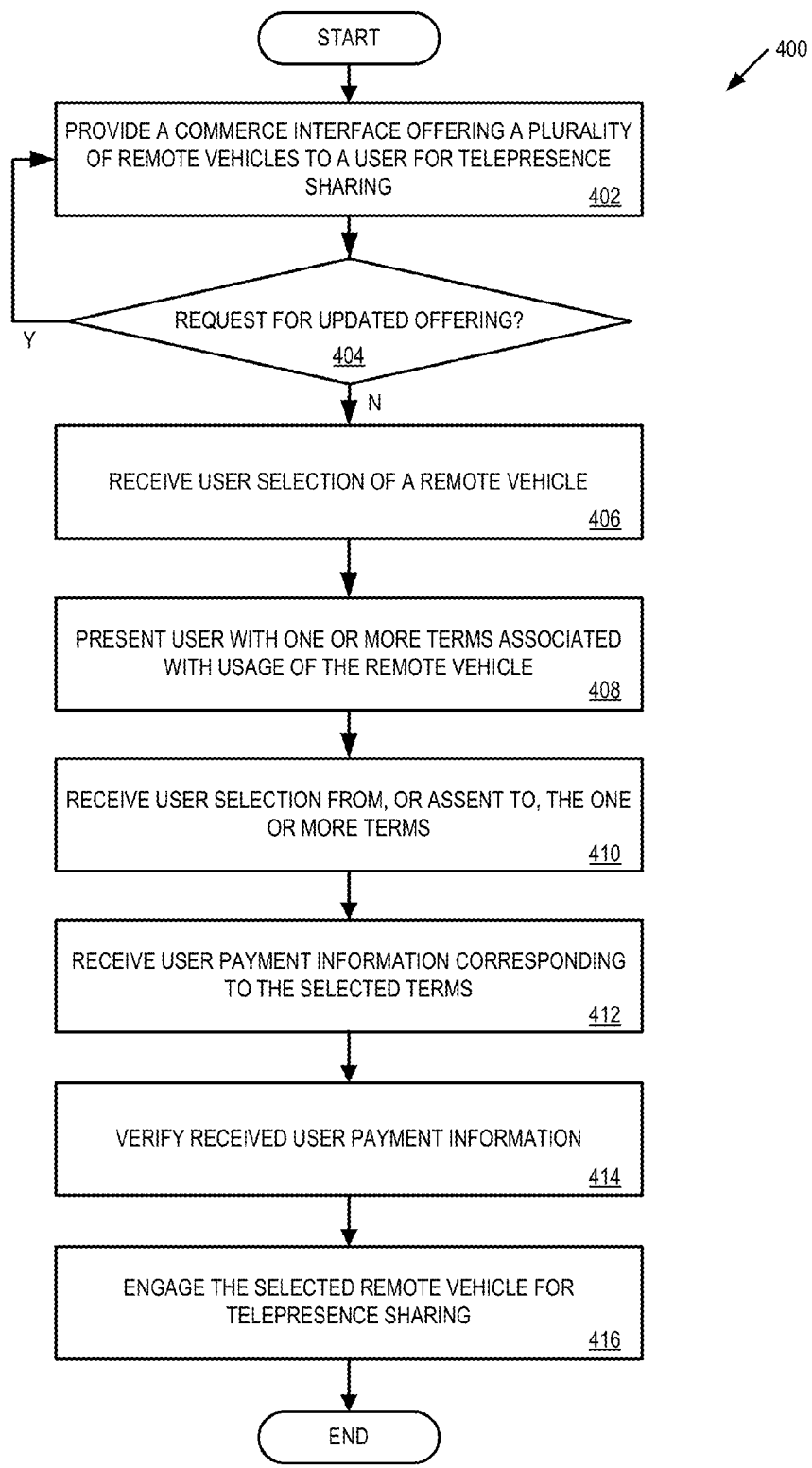
FIG. 4 is a flow diagram of one embodiment of a method for engaging a remote vehicle for telepresence sharing with a commerce interface.

FIG. 4 is a flow diagram of one embodiment of a method 400 for engaging a remote vehicle for telepresence sharing with a commerce interface. The method 400 is performed by processing logic that may comprise hardware (circuitry, dedicated logic, etc.), software (such as is run on a general purpose computer system or a dedicated machine), firmware, or a combination. In one embodiment, the method 400 is performed by a telepresence sharing system (e.g., telepresence sharing system 132 or 232).

Figure 7:
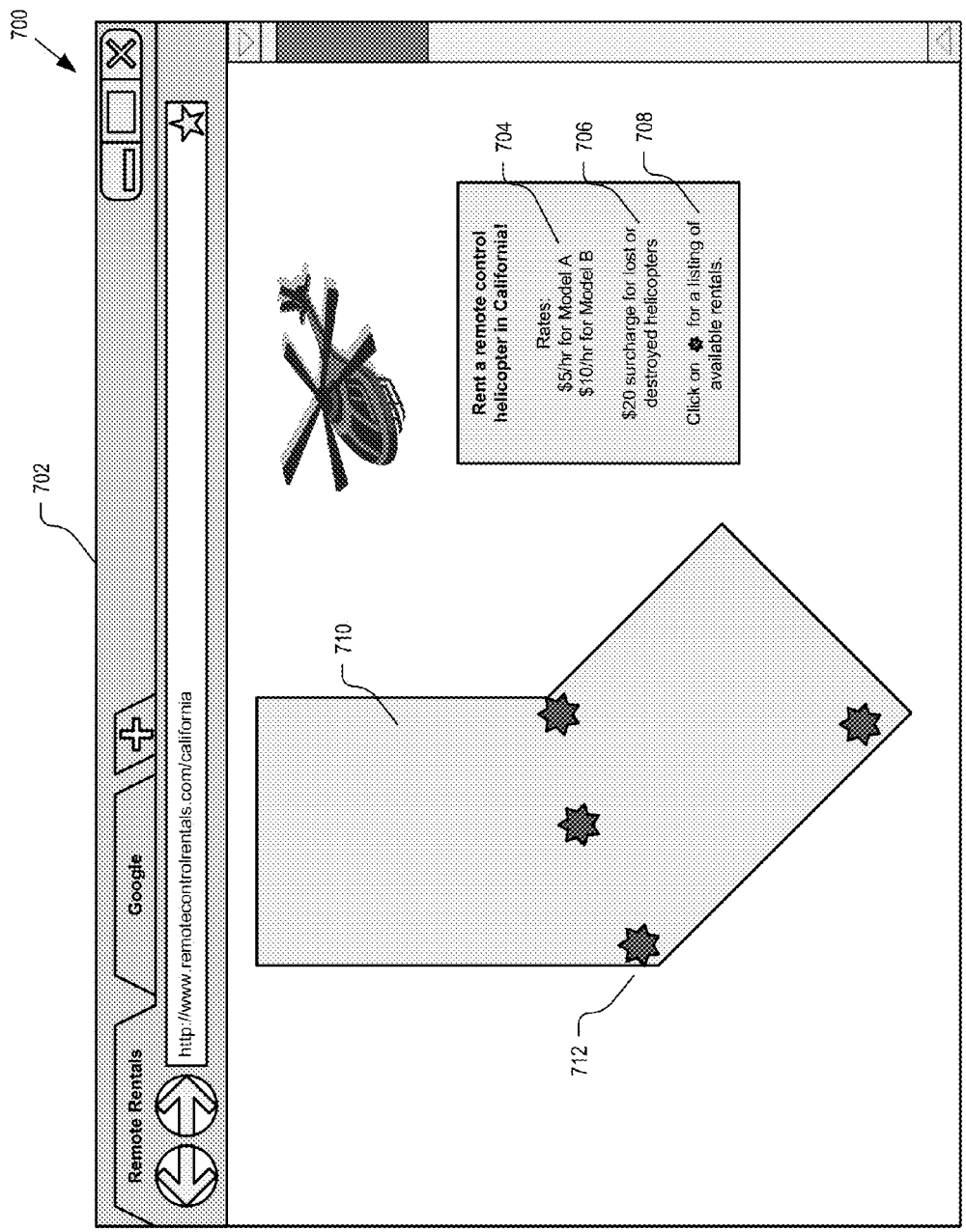
FIG. 7 illustrates an example commerce interface to a telepresence sharing system.

Referring to FIG. 4, processing logic begins by providing a commerce interface that offers a plurality of remote vehicles to a user for telepresence sharing (processing block 402). In one embodiment, the commerce interface may provide a listing of remote vehicles, by location, vehicle type, price, etc. that are available for telepresence sharing. In one embodiment, the telepresence sharing may include user control of the remote vehicle. In one embodiment, the commerce interface displays a map image with indicia, such as dots, stars, links, icons, etc., that indicate where on the map a remote vehicle is available. For example, FIG. 7 illustrates an exemplary commerce interface 700 in a web browser 702 that displays a map 710 of California. The stars 712 indicate locations where remote vehicles are available for telepresence sharing. As yet another example, the commerce interface could be embedded in an existing map application, such as Google Maps™ with Street View™. In the example, when a user views a street level view of a location, a visual indication could be displayed on the street view, such as star 712 illustrated in FIG. 7, that indicates a remote vehicle is available near the current street location being viewed.

In one embodiment, the commerce interface may also provide a listing of available remote vehicles that offer virtual tours at various real-world locations. In one embodiment, a telepresence sharing tour may include the remote vehicle traveling around a user-selected location according to a pre-configured flight plan. In this embodiment, a user that has engaged the remote vehicle in the telepresence sharing tour may view live video captured by the remote vehicle as the vehicle drives, flies, or boats along a path specified by the pre-configured flight plan. Furthermore, in one embodiment, instead of enabling a user to control the operations of the remote vehicle on a telepresence sharing tour, a camera device of the remote vehicle may be controlled by a user utilizing the command routing processes discussed herein. For example, when a user rents a remote helicopter to tour Egypt, the helicopter may be configured to fly around the Sphynx. Then as the remote helicopter is flying, a user is enabled to control the direction of a camera on board the remote helicopter by user-initiated command (e.g., left, right, up, down, etc. indicated by a corresponding movement of a mobile device associated with the user). Thus, a user can choose what they view along the pre-configured route of a remote vehicle that offers a virtual tour. In one embodiment, the locations of remote vehicles that offer telepresence sharing tours can be provided via a map application, commerce interfaces, etc. as discussed herein.

In one embodiment, processing logic determines whether a request for an updated offering has been received (processing block 404). For example, a user may request that the type of remote vehicles being offered be limited to a specific type (e.g., only remote controlled helicopters, only commercial airline pilot views, etc.). A user may also limit the offered remote vehicles to a specific geographic region (e.g., only remote vehicles from Egypt, only remote vehicles in Washington D.C., etc.). When a request to update the offering is received, processing logic returns to processing block 402 to provide an updated commerce offering interface based on the requested update.

When no request to update the offering is received, processing logic receives a user selection of a remote vehicle (processing block 406). For example, a user may select star icon 712 illustrated in FIG. 7 to select a remote vehicle in the San Francisco bay area. In response to receiving the user selection, processing logic presents the user with one or more terms associated with usage of the remote vehicle (processing block 408). As discussed above the terms may include prices, rental duration, option to purchase, insurance, etc. As further illustrated in FIG. 7, a rental rate 704, surcharge for losing or destroying the remote vehicle 706, and instructions 708 for selecting specific vehicles may be presented in the commerce interface.

Processing logic then receives a user selection from, or assent to, the one or more terms (processing block 410). User selectable terms may include a rental rate, whether the user is renting or purchasing the remote vehicle, whether the user has accepted a damages waiver, etc. User terms that require assent may include terms of usage, such as a requirement that the remote vehicle be returned to a rental location or charging station, the remote vehicle may not be used to injure another, etc. Processing logic also receives user payment information, such as credit card information, PAY PAL™ account information, etc., corresponding to the selected terms (processing block 412). In one embodiment, the user selected terms and payment information are stored in a telepresence commerce database. After the payment information is verified by processing logic (processing block 414), processing logic engages the selected remote vehicle for telepresence sharing (processing block 416).

Figure 5:
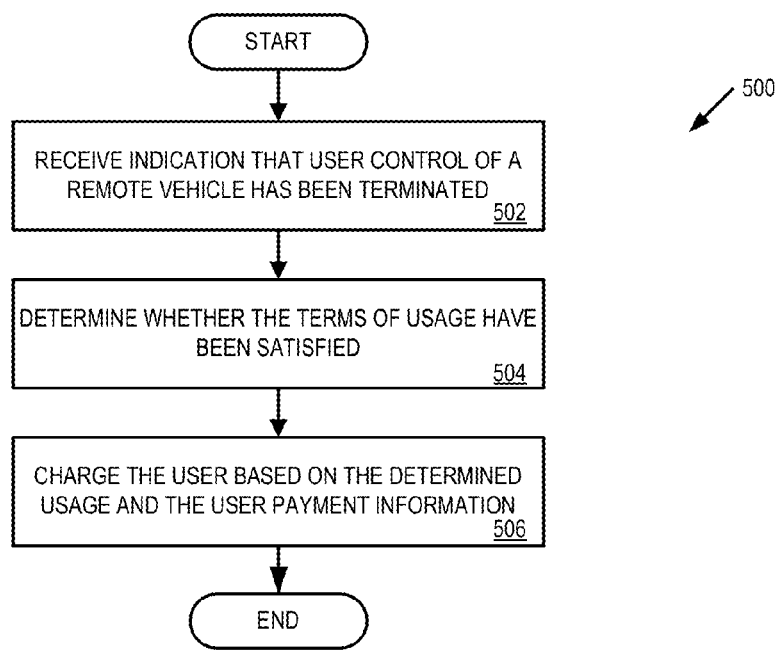
FIG. 5 is a flow diagram of one embodiment of a method for charging a user for a telepresence sharing session.

FIG. 5 is a flow diagram of one embodiment of a method 500 for charging a user for a telepresence sharing session. The method 500 is performed by processing logic that may comprise hardware (circuitry, dedicated logic, etc.), software (such as is run on a general purpose computer system or a dedicated machine), firmware, or a combination. In one embodiment, the method 500 is performed by a telepresence sharing system (e.g., telepresence sharing system 132 or 232).

Referring to FIG. 5, processing logic begins by receiving an indication that user control of a remote vehicle has been terminated (processing block 502). In one embodiment, user control of a remote vehicle can be terminated affirmatively by a user, such as by closing a telepresence client. In another embodiment, user control of a remote vehicle can be terminated when the vehicle is returned to the rental location or a charging station operated by the rental location. In yet another embodiment, user control of a remote vehicle can be terminated when the vehicle is destroyed (e.g., when a remote control helicopter crashes into the ground, inadvertently flies into a building, or is otherwise destroyed).

Processing logic determines whether the terms of usage for the telepresence session were satisfied (processing block 504). In one embodiment, processing logic queries a telepresence commerce database to determine whether, for example, the user agreed to return the remote vehicle to the base station, whether the user did not go over their purchased time, whether the user operated the remote vehicle outside of a rental area, etc. Based on whether the use has satisfied the terms of usage, processing logic charges the user (processing block 506). In one embodiment, the user payment information is obtained from a telepresence commerce database utilized by the processing logic to charge the user for the telepresence sharing session.

Figure 8:
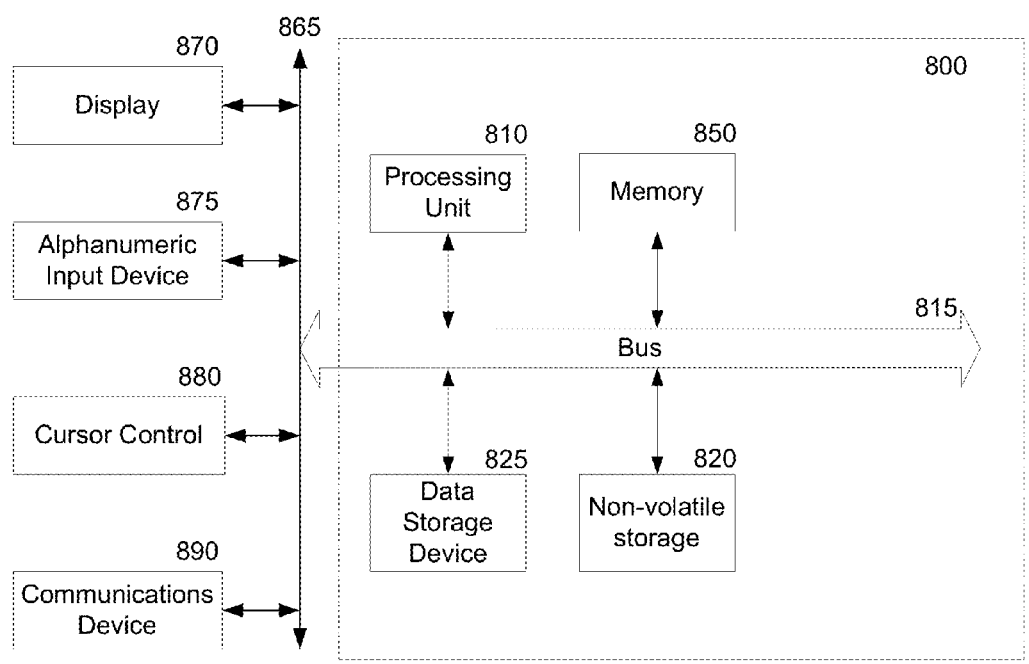
FIG. 8 illustrates a diagrammatic representation of a machine in the exemplary form of a computer system.

FIG. 8 is one embodiment of a computer system that may be used with the present invention. It will be apparent to those of ordinary skill in the art, however that other alternative systems of various system architectures may also be used.

The data processing system illustrated in FIG. 8 includes a bus or other internal communication means 815 for communicating information, and a processor 810 coupled to the bus 815 for processing information. The system further comprises a random access memory (RAM) or other volatile storage device 850 (referred to as memory), coupled to bus 815 for storing information and instructions to be executed by processor 810. Main memory 850 also may be used for storing temporary variables or other intermediate information during execution of instructions by processor 810. The system also comprises a read only memory (ROM) and/or static storage device 820 coupled to bus 815 for storing static information and instructions for processor 810, and a data storage device 825 such as a magnetic disk or optical disk and its corresponding disk drive. Data storage device 825 is coupled to bus 815 for storing information and instructions.

The system may further be coupled to a display device 870, such as a cathode ray tube (CRT) or a liquid crystal display (LCD) coupled to bus 815 through bus 865 for displaying information to a computer user. An alphanumeric input device 875, including alphanumeric and other keys, may also be coupled to bus 815 through bus 865 for communicating information and command selections to processor 810. An additional user input device is cursor control device 880, such as a mouse, a trackball, stylus, or cursor direction keys coupled to bus 815 through bus 865 for communicating direction information and command selections to processor 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments of the present invention.

It will be appreciated by those of ordinary skill in the art that any configuration of the system may be used for various purposes according to the particular implementation. The control logic or software implementing the present invention can be stored in main memory 850, mass storage device 825, or other storage medium locally or remotely accessible to processor 810.

It will be apparent to those of ordinary skill in the art that the system, method, and process described herein can be implemented as software stored in main memory 850 or read only memory 820 and executed by processor 810. This control logic or software may also be resident on an article of manufacture comprising a computer readable medium having computer readable program code embodied therein and being readable by the mass storage device 825 and for causing the processor 810 to operate in accordance with the methods and teachings herein.

The present invention may also be embodied in a handheld or portable device containing a subset of the computer hardware components described above. For example, the handheld device may be configured to contain only the bus 815, the processor 810, and memory 850 and/or 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 810, a data storage device 825, a bus 815, and memory 850, and only rudimentary communications mechanisms, such as a small touch-screen that permits the user to communicate in a basic manner with the device. In general, the more special-purpose the device is, the fewer of the elements need be present for the device to function.

FIG. 9 illustrates an example system 900 for telepresence sharing with a wearable computing system. The system 900 is shown in the form of a wearable computing device. While FIG. 9 illustrates eyeglasses 902 as an example of a wearable computing device, other types of wearable computing devices could additionally or alternatively be used. As illustrated in FIG. 9, the eyeglasses 902 comprise frame elements including lens-frames 904 and 906 and a center frame support 908, lens elements 910 and 912, and extending side-arms 914 and 916. The center frame support 908 and the extending side-arms 914 and 916 are configured to secure the eyeglasses 902 to a user's face via a user's nose and ears, respectively. Each of the frame elements 904, 906, and 908 and the extending side-arms 914 and 916 may be formed of a solid structure of plastic or metal, or may be formed of a hollow structure of similar material so as to allow wiring and component interconnects to be internally routed through the eyeglasses 902. Each of the lens elements 910 and 912 may be formed of any material that can suitably display a projected image or graphic. Each of the lens elements 910 and 912 may also be sufficiently transparent to allow a user to see through the lens element. Combining these two features of the lens elements can facilitate an augmented reality or heads-up display where the projected image or graphic is superimposed over a real-world view as perceived by the user through the lens elements.

The extending side-arms 914 and 916 are each projections that extend away from the frame elements 904 and 906, respectively, and are positioned behind a user's ears to secure the eyeglasses 902 to the user. The extending side-arms 914 and 916 may further secure the eyeglasses 902 to the user by extending around a rear portion of the user's head. Additionally or alternatively, for example, the system 100 may connect to or be affixed within a head-mounted helmet structure. Other possibilities exist as well.

The system 900 may also include an on-board computing system 918, a video camera 920, a sensor 922, and finger-operable touch pads 924, 926. The on-board computing system 918 is shown to be positioned on the extending side-arm 914 of the eyeglasses 902; however, the on-board computing system 918 may be provided on other parts of the eyeglasses 902. The on-board computing system 918 may include a processor and memory, for example. The on-board computing system 918 may be configured to receive and analyze data from the video camera 920 and the finger-operable touch pads 924, 926 (and possibly from other sensory devices, user interfaces, or both) and generate images for output from the lens elements 910 and 912. The video camera 920 is shown to be positioned on the extending side-arm 914 of the eyeglasses 902; however, the video camera 920 may be provided on other parts of the eyeglasses 902. The video camera 920 may be configured to capture images at various resolutions or at different frame rates. Many video cameras with a small form-factor, such as those used in cell phones or webcams, for example, may be incorporated into an example of the system 900. Although FIG. 9 illustrates one video camera 920, more video cameras may be used, and each may be configured to capture the same view, or to capture different views. For example, the video camera 920 may be forward facing to capture at least a portion of the real-world view perceived by the user. This forward facing image captured by the video camera 920 may then be used to generate an augmented reality where computer generated images appear to interact with the real-world view perceived by the user.

The sensor 922 is shown mounted on the extending side-arm 916 of the eyeglasses 902; however, the sensor 922 may be provided on other parts of the eyeglasses 902. The sensor 922 may include one or more of a gyroscope or an accelerometer, for example. Other sensing devices may be included within the sensor 922 or other sensing functions may be performed by the sensor 922. The finger-operable touch pads 924, 926 are shown mounted on the extending side-arms 914, 916 of the eyeglasses 902. Each of finger-operable touch pads 924, 926 may be used by a user to input commands. The finger-operable touch pads 924, 926 may sense at least one of a position and a movement of a finger via capacitive sensing, resistance sensing, or a surface acoustic wave process, among other possibilities. The finger-operable touch pads 924, 926 may be capable of sensing finger movement in a direction parallel or planar to the pad surface, in a direction normal to the pad surface, or both, and may also be capable of sensing a level of pressure applied. The finger-operable touch pads 924, 926 may be formed of one or more translucent or transparent insulating layers and one or more translucent or transparent conducting layers. Edges of the finger-operable touch pads 924, 926 may be formed to have a raised, indented, or roughened surface, so as to provide tactile feedback to a user when the user's finger reaches the edge of the finger-operable touch pads 924, 926. Each of the finger-operable touch pads 924, 926 may be operated independently, and may provide a different function.

FIG. 10 illustrates an alternate view 1000 of the system 900 of FIG. 9. As shown in FIG. 10, the lens elements 1010 and 1012 may act as display elements. The eyeglasses 1002 may include a first projector 1028 coupled to an inside surface of the extending side-arm 1016 and configured to project a display 1030 onto an inside surface of the lens element 1012.

Additionally or alternatively, a second projector 1032 may be coupled to an inside surface of the extending sidearm 1014 and configured to project a display 1034 onto an inside surface of the lens element 1010. The lens elements 1010 and 1012 may act as a combiner in a light projection system and may include a coating that reflects the light projected onto them from the projectors 1028 and 1032.

In some embodiments, a special coating may not be used (e.g., when the projectors 1028 and 1032 are scanning laser devices). In alternative embodiments, other types of display elements may also be used. For example, the lens elements 1010, 1012 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 1004 and 1006 for driving such a matrix display. Alternatively or additionally, a laser or LED source and scanning system could be used to draw a raster display directly onto the retina of one or more of the user's eyes. Other possibilities exist as well.

FIG. 11 illustrates an example schematic drawing of a computer network infrastructure. In one system 1136, a device 1138 communicates using a communication link 1140 (e.g., a wired or wireless connection) to a remote device 1142. The device 1138 may be any type of device that can receive data and display information corresponding to or associated with the data. For example, the device 1138 may be a heads-up display system, such as the eyeglasses 902 and 1002 described with reference to FIGS. 9 and 10. Thus, the device 1138 may include a display system 1144 comprising a processor 1146 and a display 1148. The display 1148 may be, for example, an optical see-through display, an optical see-around display, or a video see-through display. The processor 1146 may receive data from the remote device 1142, and configure the data for display on the display 1148. The processor 1146 may be any type of processor, such as a microprocessor or a digital signal processor, for example. The device 1138 may further include on-board data storage, such as memory 1150 coupled to the processor 1146. The memory 1150 may store software that can be accessed and executed by the processor 1146, for example.

The remote device 1142 may be any type of computing device or transmitter including a laptop computer, a mobile telephone, etc., that is configured to transmit data to the device 1138. The remote device 1142 and the device 1138 may contain hardware to enable the communication link 1140, such as processors, transmitters, receivers, antennas, etc.

In FIG. 11, the communication link 1140 is illustrated as a wireless connection; however, wired connections may also be used. For example, the communication link 1140 may be a wired link via a serial bus such as a universal serial bus or a parallel bus. A wired connection may be a proprietary connection as well. The communication link 1140 may also be a wireless connection using, e.g., Bluetooth® radio technology, communication protocols described in IEEE 802.11 (including any IEEE 802.11 revisions), Cellular technology (such as GSM, CDMA, UMTS, EVDO, WiMAX, or LTE), or Zigbee® technology, among other possibilities. The remote device 1142 may be accessible via the Internet and may comprise a computing cluster associated with a particular web service (e.g., social-networking, photo sharing, address book, etc.).

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

I claim:

1. A computer-implemented method, comprising:
providing, from a server computer system, an indication of a plurality of remote vehicles that are available for telepresence sharing to a user, wherein the indication is provided in a commerce interface that enables the user to rent remote control vehicles for telepresence sharing tours along pre-configured travel routes at different real-world locations;
providing, in the commerce interface, one or more financial terms and one or more terms of usage associated with a telepresence sharing tour of a real world location provided by a remote vehicle that travels along a pre-configured travel route of a real world location, wherein the one or more financial terms include a price associated with the telepresence sharing session for the remote vehicle, and wherein a first price is charged for the telepresence sharing session when the remote vehicle returns to a rental location, and a second price is charged when the remote vehicle does not return to the rental location;
receiving a selection from the user to engage the remote vehicle from the plurality of remote vehicles in the telepresence sharing session, wherein the selection by the user rents the remote vehicle from the commerce interface for the telepresence sharing tour of the real-world location that causes the remote vehicle to automatically travel along the pre-configured travel route to provide the telepresence sharing tour of the real-world location;
providing a live video feed captured by the remote vehicle to a mobile device associated with the user;
receiving a user command from the mobile device to control a direction of a camera of the remote vehicle while the remote vehicle travels along the pre-configured travel route, wherein the user command corresponds to a real world movement of the mobile device by a user; and
transmitting the user command to the remote vehicle to cause the remote vehicle to execute the user command to control the direction of the camera.

2. The computer implemented method of claim 1, wherein the commercial interface is a map image with visual indicia displayed on locations of the map that correspond to real world locations where the plurality of remote control vehicle that are available for telepresence sharing are located.

3. The computer implemented method of claim 1, wherein the commercial interface is a street view of a real world location displayed in a map application, the street view includes one or more visual indicia displayed over the street view to indicate that one or more of the plurality of remote vehicles that are available for telepresence sharing are located near the real world location in the street view.

4. The computer-implemented method of claim 1, wherein the user command is a command associated with a user movement of the mobile device.

5. The computer-implemented method of claim 4, wherein the mobile device is a user-wearable computing device.

6. The computer-implemented method of claim 5, wherein the user-wearable computing device is in the form of eyeglasses and worn by the user to render the live video feed to the user, wherein a first user command generated from the user wearing the user-wearable computing device looking up causes the remote vehicle to ascend, a second user command generated from the user wearing the user-wearable computing device looking down causes the remote vehicle to descend, a third user command generated from the user wearing the user-wearable computing device looking right causes the remote vehicle to turn right, and a fourth user command generated from the user wearing the user-wearable computing device looking left causes the remote vehicle to turn left.

7. The computer-implemented method of claim 1, wherein the remote vehicle executes the user command in near real time.

8. A non-transitory computer readable storage medium including instructions that, when executed by a processor, cause the processor to perform a method comprising:
providing an indication of a plurality of remote vehicles that are available for telepresence sharing to a user, wherein the indication is provided in a commerce interface that enables the user to rent remote control vehicles for telepresence sharing tours along pre-configured travel routes at different real-world locations;
providing, in the commerce interface, one or more financial terms and one or more terms of usage associated with a telepresence sharing tour of a real world location provided by a remote vehicle that travels along a pre-configured travel route of a real world location, wherein the one or more financial terms include a price associated with the telepresence sharing session for the remote vehicle, and wherein a first price is charged for the telepresence sharing session when the remote vehicle returns to a rental location, and a second price is charged when the remote vehicle does not return to the rental location;
receiving a selection from the user to engage the remote vehicle from the plurality of remote vehicles in the telepresence sharing session, wherein the selection by the user rents the remote vehicle from the commerce interface for the telepresence sharing tour of the real-world location that causes the remote vehicle to automatically travel along the pre-configured travel route to provide the telepresence sharing tour of the real-world location;
providing a live video feed captured by the remote vehicle to a mobile device associated with the user;
receiving a user command from the mobile device to control a direction of a camera of the remote vehicle while the remote vehicle travels along the pre-configured travel route, wherein the user command corresponds to a real world movement of the mobile device by a user;
and transmitting the user command to the remote vehicle to cause the remote vehicle to execute the user command to control the direction of the camera.

9. The computer readable storage medium of claim 8, wherein the commercial interface is a map image with visual indicia displayed on locations of the map that correspond to real world locations where the plurality of remote control vehicle that are available for telepresence sharing are located.

10. The computer readable storage medium of claim 8, wherein the commercial interface is a street view of a real world location displayed in a map application, the street view includes one or more visual indicia displayed over the street view to indicate that one or more of the plurality of remote vehicles that are available for telepresence sharing are located near the real world location in the street view.

11. A system comprising:
a memory; and
a processor coupled with the memory to
provide an indication of a plurality of remote vehicles that are available for telepresence sharing to a user, wherein the indication is provided in a commerce interface that enables the user to rent remote control vehicles for telepresence sharing tours along pre-configured travel routes at different real-world locations,
provide, in the commerce interface, one or more financial terms and one or more terms of usage associated with a telepresence sharing tour of a real world location provided by a remote vehicle that travels along a pre-configured travel route of a real world location, wherein the one or more financial terms include a price associated with the telepresence sharing session for the remote vehicle, and wherein a first price is charged for the telepresence sharing session when the remote vehicle returns to a rental location, and a second price is charged when the remote vehicle does not return to the rental location;
receive a selection from the user to engage the remote vehicle from the plurality of remote vehicles in the telepresence sharing session, wherein the selection by the user rents the remote vehicle from the commerce interface for the telepresence sharing tour of the real-world location that causes the remote vehicle to automatically travel along the pre-configured travel route to provide the telepresence sharing tour of the real-world location,
provide a live video feed captured by the remote vehicle to a mobile device associated with the user,
receive a user command from the mobile device to control a direction of a camera of the remote vehicle while the remote vehicle travels along the pre-configured travel route, wherein the user command corresponds to a real world movement of the mobile device by a user; and
transmit the user command to the remote vehicle to cause the remote vehicle to execute the user command to control the direction of the camera.

12. The system of claim 11, wherein the commercial interface is a map image with visual indicia displayed on locations of the map that correspond to real world locations where the plurality of remote control vehicle that are available for telepresence sharing are located.

13. The system of claim 11, wherein the commercial interface is a street view of a real world location displayed in a map application, the street view includes one or more visual indicia displayed over the street view to indicate that one or more of the plurality of remote vehicles that are available for telepresence sharing are located near the real world location in the street view.

14. The system of claim 11, wherein the user command is a command associated with a user movement of the mobile device.

15. The system of claim 14, wherein the mobile device is a user-wearable computing device.

16. The system of claim 15, wherein the user-wearable computing device is in the form of eyeglasses and worn by the user to render the live video feed to the user, wherein a first user command generated from the user wearing the user-wearable computing device looking up causes the remote vehicle to ascend, a second user command generated from the user wearing the user-wearable computing device looking down causes the remote vehicle to descend, a third user command generated from the user wearing the user-wearable computing device looking right causes the remote vehicle to turn right, and a fourth user command generated from the user wearing the user-wearable computing device looking left causes the remote vehicle to turn left.

17. The system of claim 11, wherein the remote vehicle executes the user command in near real time.

* * * * *